(12) United States Patent
Delnoij

(10) Patent No.: US 8,638,036 B2
(45) Date of Patent: Jan. 28, 2014

(54) WAKE-UP OF LIGHT SENSOR IN A LIGHTING SYSTEM

(75) Inventor: Roger Peter Anna Delnoij, Lommel (BE)

(73) Assignee: Koninklijke Philips N.V., Eindhoven (NL)

( * ) Notice: Subject to any disclaimer, the term of this patent is extended or adjusted under 35 U.S.C. 154(b) by 130 days.

(21) Appl. No.: 13/376,012

(22) PCT Filed: May 28, 2010

(86) PCT No.: PCT/IB2010/052384
§ 371 (c)(1), (2), (4) Date: Dec. 2, 2011

(87) PCT Pub. No.: WO2010/140094
PCT Pub. Date: Dec. 9, 2010

(65) Prior Publication Data
US 2012/0074852 A1    Mar. 29, 2012

(30) Foreign Application Priority Data

Jun. 4, 2009 (EP) .................................... 09161973

(51) Int. Cl.
*H05B 37/02* (2006.01)
(52) U.S. Cl.
USPC ............ 315/158; 315/150; 315/154; 315/149
(58) Field of Classification Search
USPC ......... 315/158, 150, 154, 149, 152, 294, 312, 315/318, 159, 307
See application file for complete search history.

(56) References Cited

U.S. PATENT DOCUMENTS

| 5,293,097 | A | * | 3/1994 | Elwell | 315/154 |
|---|---|---|---|---|---|
| 5,455,487 | A | | 10/1995 | Mix et al. | |
| 6,144,161 | A | | 11/2000 | Kimmich et al. | |
| 6,815,906 | B1 | * | 11/2004 | Aarons et al. | 315/209 R |
| 7,436,132 | B1 | * | 10/2008 | Null | 315/312 |
| 8,067,906 | B2 | * | 11/2011 | Null | 315/361 |

(Continued)

FOREIGN PATENT DOCUMENTS

| DE | 102004058051 B3 | 8/2006 |
|---|---|---|
| EP | 1291629 A2 | 3/2003 |

(Continued)

OTHER PUBLICATIONS

"CargoNet: Micropower sensate tags for supply-chain management and security" by Mateusz Ksawery Malinowski downloaded from http://www.media.mit.edu/resenv/pubs/theses/malinowski_meng. pdf, Feb. 2007.
Arms et al., "Power management for energy harvesting wireless sensors", pp. 1-9, San Diego, 2005.

*Primary Examiner* — Vibol Tan
(74) *Attorney, Agent, or Firm* — Mark L. Beloborodov

(57) ABSTRACT

A wireless light sensor, being part of a lighting system, has a sensor element generating a light measuring signal, a microcontroller coupled to the sensor element, and a radio communication device coupled to the microcontroller. The microcontroller has an active mode and a sleeping mode. The light sensor further has a wake-up circuit which determines a rate of change of the light measuring signal, when the microcontroller is in the sleeping mode. The wake-up circuit brings the microcontroller from the sleeping mode into the active mode, when the rate of change of the light measuring signal exceeds a predetermined threshold.

7 Claims, 2 Drawing Sheets

(56) References Cited

U.S. PATENT DOCUMENTS

| | | | |
|---|---|---|---|
| 8,111,008 B2* | 2/2012 | Veskovic et al. | 315/291 |
| 8,354,793 B2* | 1/2013 | Cash et al. | 315/150 |
| 2003/0209999 A1* | 11/2003 | Hui et al. | 315/294 |
| 2005/0051704 A1 | 3/2005 | Kashiura et al. | |
| 2012/0235579 A1* | 9/2012 | Chemel et al. | 315/152 |

FOREIGN PATENT DOCUMENTS

| | | |
|---|---|---|
| EP | 1538579 A1 | 6/2005 |
| WO | 2005101917 A1 | 10/2005 |
| WO | 2007072193 A2 | 6/2007 |
| WO | 2010010491 A2 | 1/2010 |
| WO | 2010010491 A3 | 1/2010 |

* cited by examiner

WAKE-UP OF LIGHT SENSOR IN A LIGHTING SYSTEM

FIELD OF THE INVENTION

The invention relates to the field of light sensors, and more specifically to the field of wireless light sensors, as used in a lighting system.

BACKGROUND OF THE INVENTION

Energy saving is globally seen as vital for our environment. Legislation in North America and Europe is requiring energy saving measures.

Within the field of building automation, building automation equipment controlled by sensors is an important enabler for achieving the energy saving. In particular in the field of lighting systems, occupancy sensors and light sensors used for daylight harvesting are widely used for energy saving. Daylight harvesting uses a light sensor to control the light output of an artificial light dependent on the ambient light or daylight such that a light level in a room can be kept constant. When, during daytime, sunlight enters the room, and contributes to the light level in the room, the light output of the artificial light may be reduced with increasing ambient light, whereby energy is saved.

Although a sensor may be coupled to a building automation controller of building automation equipment by wires, flexibility of installation and reduction of installation costs for fitting and for retrofitting may be obtained by using wireless sensors, as they require no (new) wires. At least the low installation costs justify any extra costs of the wireless sensors. For a truly wireless sensor, not only the communication between the sensor and the building automation equipment or the communication between different sensors is wireless, but also the power supply of the sensor is wireless. This can be achieved by using a battery or by energy harvesting/scavenging, such as by a photovoltaic solar panel.

A wireless sensor comprises at least a sensor element for measuring a quantity level, a microcontroller device at least for obtaining and processing a measuring value from the sensor element, and a communication device for transmitting a data signal.

A wireless sensor provides a measuring signal to a controller of the building automation equipment by a suitable wireless communication transmission, e.g. based on the ZigBee standard (IEEE 802.15.4). The communication of a wireless sensor consumes a lot of power, so a communication duty cycle should be kept as low as possible. Also the sensor should be put in a sleep mode when not used. According to the ZigBee standard, this is supported via so-called "sleeping end devices" in a ZigBee network.

For a wireless light sensor that monitors a light level, the power consumption may be 40 µA on average in an active mode of the microcontroller, based on a CC2430 device manufactured by Chipcon/Texas Instruments. A microcontroller of the light sensor samples the sensor element every second to measure a light level, and to provide a corresponding wireless measuring signal via the light sensor's communication device to a light system controller to dim an artificial light to a required level. However, in most building applications, such as office applications, artificial light is not necessary during a complete 24 hour day. Consequently, the light level in the room need not be monitored 24 hours a day through light sensors. If the light level e.g. needs only be measured during 8 hours a day for 5 days per week, the average power consumption will be around 10 µA. Taking a 1000 mAh battery as a reference, the battery lifetime may then be more than 11 years.

Although such an operation of the light sensor is advantageous in saving energy and prolonging battery lifetime, when the (microcontroller of the) light sensor is in a sleeping mode, the communication device is active with a very low duty cycle, and thus is most of the time turned off When the communication device component is turned off, the photosensor is unable to communicate with other devices. The light sensor only receives messages shortly after itself has sent a message.

This blocks the possibility of the light sensor to retrieve a lamp status, as communication is impossible when the (microcontroller of the) light sensor is in a sleeping mode. If one would wake up the light sensor every minute to check the light level, this would still cost considerable energy, e.g. an average current of 8 µA. In case of a light level check every minute, an average latency in a light control loop of the lighting system controller would be 30 seconds, which is considered unacceptable. Also the actual, current light level would be unknown for the light control loop. Consequently, the light control loop would start at a fixed point, and change the dimming of the artificial light from the fixed point to a correct light level. This is undesirable.

SUMMARY OF THE INVENTION

It would be desirable to provide a wireless light sensor with a very low power consumption, yet providing an adequate control in a lighting system.

To better address one or more of the above concerns, in a first aspect of the invention a wireless light sensor is provided comprising:

a sensor element generating a light measuring signal;

a microcontroller coupled to the sensor element, the microcontroller having an active mode and a sleeping mode; and a radio communication device coupled to the microcontroller, wherein the light sensor further comprises a wake-up circuit configured for determining a rate of change of the light measuring signal, when the microcontroller is in the sleeping mode, and bringing the microcontroller from the sleeping mode into the active mode, when the rate of change of the light measuring signal exceeds a predetermined threshold.

In a further aspect of the invention, a method of operating a wireless light sensor is provided, the light sensor comprising:

a sensor element generating a light measuring signal;

a microcontroller coupled to the sensor element, the microcontroller having an active mode and a sleeping mode; and a radio communication device coupled to the microcontroller, wherein the method comprises determining a rate of change of the light measuring signal, when the microcontroller is in the sleeping mode, and bringing the microcontroller from the sleeping mode into the active mode, when the rate of change of the light measuring signal exceeds a predetermined threshold.

In a still further aspect of the invention, a lighting system is provided, the lighting system comprising:

at least one light source;

a controller for controlling the light source; and the light sensor according to the invention.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
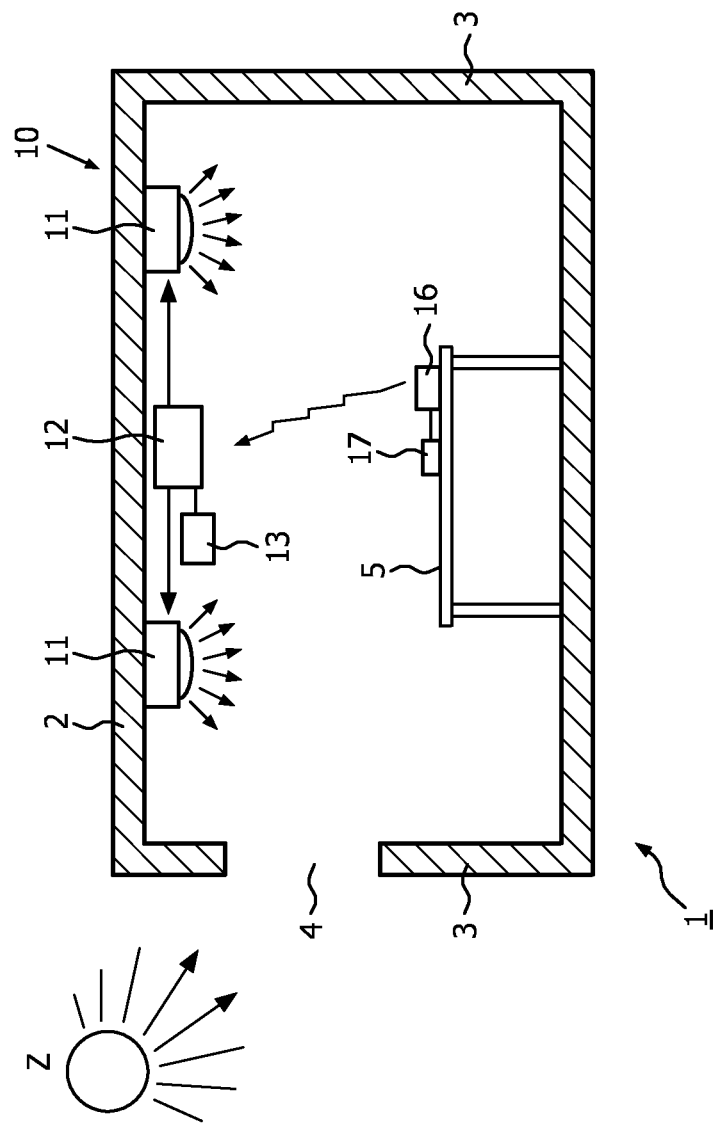
FIG. 1 schematically depicts an office room.

FIG. 1 schematically shows a side view of an office room 1, having a ceiling 2 and walls 3, and having at least one window 4 in at least one of the walls 3 (the left-hand wall in this case). An office desk is schematically shown at 5. The room is provided with an illumination system (or lighting system) 10, which comprises at least one light source 11 and a controller for controlling the light source(s). The controller 12 may e.g. be implemented as a suitably programmed microprocessor or the like. Each light source 11 may e.g. be implemented as an incandescent lamp, a gas discharge lamp, an LED, or any other light producing structure. Each light source may be provided with a dedicated controller, or multiple light sources may share a common controller. In any case, the light sources are controllable, which is dimmable, capable of producing different light intensities determined in a controller. Since controllable light sources as well as controllers for controlling such light sources are known per se, a further explanation is not needed here. By way of example, controlling the light output of a light source may be implemented by duty cycle control, as is known to a person skilled in the art. In the following, a light source is also simply indicated as a lamp, which includes an LED.

The system 10 may be adapted to keep the light intensity (or light level) at the position of the desk 5 substantially constant. For instance, if the sun Z starts shining and daylight enters the room such that the light level increases, the controller 12 adapts its control signals for the lamps 11 such as to reduce the light output of at least one lamp. The controller 12 needs to receive an input signal indicating the actual light level, and to this end the system 10 comprises at least one light sensor 16. The light sensor 16 may e.g. be mounted against the ceiling 2 or against a wall 3, but in the example of FIG. 1, the sensor 16 is positioned on the desk 5. The light sensor 16 is adapted to communicate its measuring signals to the controller 12 wirelessly. A suitable example of such wireless communication is ZigBee, but any other type of wireless communication may be used, as will be clear to a person skilled in the art. Wireless light sensors 16 are known per se, and each comprises a sensor element, a microcontroller, and a communication device.

Figure 2:
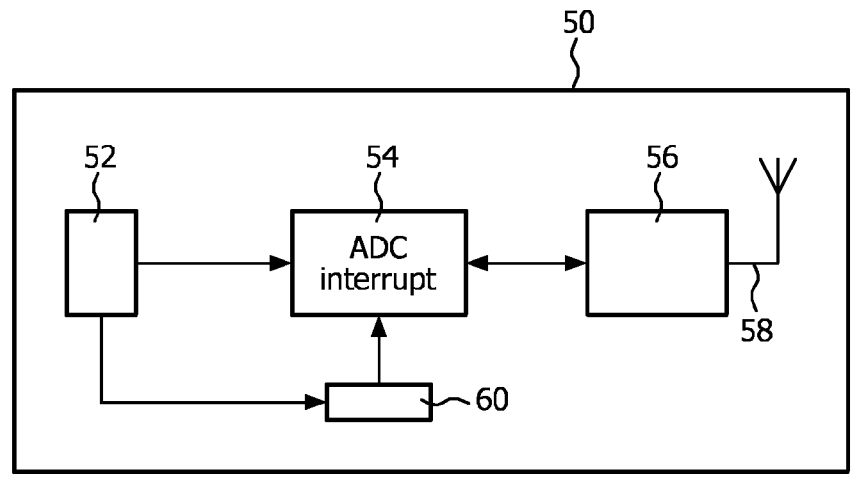
FIG. 2 is a block diagram of a wireless light sensor comprising a wake-up circuit according to the present invention.

FIG. 2 shows a block diagram of a wireless light sensor 50 comprising a light sensor element 52, providing a measuring signal representative of a level of light. A microcontroller device 54 has a first input, ADC, for input of the measuring signal from the light sensor element 52, and a second input, interrupt, for changing a mode of operation of the light sensor 50 and its microcontroller device 54, in particular for bringing the light sensor 50 and its microcontroller device 54 out of a sleeping mode into an active mode of operation. The microcontroller device 54 processes the measuring signal output by the light sensor element 52, and controls a communication device 56 coupled thereto. The communication device 56 has an antenna 58 for wireless transfer of data signals. A wake-up circuit 60, an embodiment of which will be explained by reference to FIG. 3 in more detail below, is coupled to the light sensor element 52, and to the microcontroller device 54 to provide a trigger signal to the second input, interrupt, of the microcontroller device 54 under circumstances to be described in more detail by reference to FIG. 3 below, for bringing the light sensor 50 out of a sleeping mode into an active mode of operation. The light sensor 50 has its power supplied by a battery, photovoltaic cell or similar arrangement.

Figure 3:
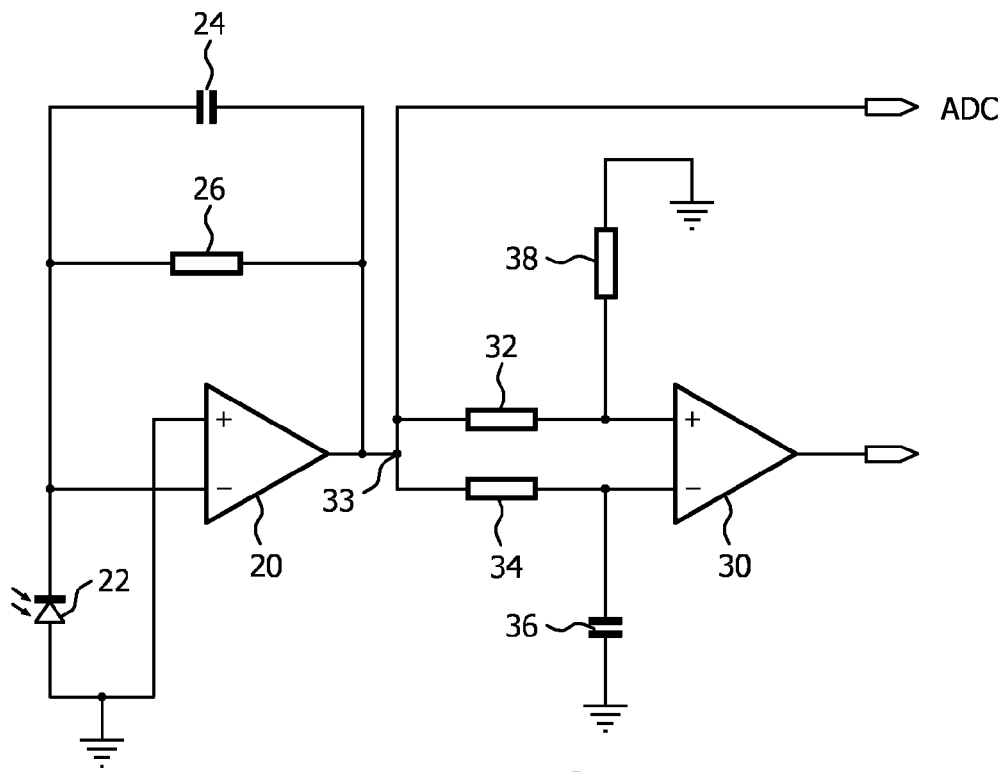
FIG. 3 depicts a circuit diagram of a wake-up circuit in an embodiment of the invention, for detecting a rise in a light level at a rate exceeding a predetermined threshold rate.

FIG. 3 depicts an embodiment of a wake-up circuit which, in this and other embodiments, is part of a light sensor according to the present invention. A (transimpedance) amplifier 20 has a "+" input and a "−" input. A photodiode 22 is connected between the "+" input and the "−" input of the amplifier 20. A parallel circuit of a first capacitor 24 and a first resistor 26 is connected between the "−" input, and an output of the amplifier 20. The "+" input of the amplifier 20 is connected to a common electrode (e.g. ground).

A comparator 30 has a "+" input and a "−" input. A series circuit of a second resistor 32 and a third resistor 34 is connected between the "+" input and the "−" input of the comparator 30. The second resistor 32 and the third resistor 34 have a common node 33 connected to the output of the amplifier 20. A second capacitor 36 is connected between the "−" input of the comparator 30 and the common electrode. A fourth resistor 38 is connected between the "+" input of the comparator 30 and the common electrode.

In operation, the photodiode 22 continuously measures a light level, and provides a corresponding measuring signal. The current through the photodiode 22 at the inputs of the amplifier 20 is converted into a corresponding voltage at the output of the amplifier 20. The RC circuit of the first capacitor 24 and the first resistor 26 provides a filtering of the measuring signal as required.

At the comparator 30, an average value of the output signal of the amplifier 20, input at the "−" input of the comparator 30, is compared to the momentary value of the output signal of the amplifier 20, input at the "+" input of the comparator 30.

Relatively slow changes of the measuring signal lead to corresponding slow changes in the output signal of the amplifier 20, and will not cause the comparator 30 to produce a trigger signal at its output. However, relatively fast changes of the measuring signal provided by the photodiode 22 lead to a significant change in the output signal of the amplifier 20, which in turn will cause the comparator 30 to output a trigger signal. The trigger signal is input to an interrupt input of the microcontroller of the wireless light sensor, thereby converting a sleeping mode of the microcontroller into an active mode thereof. At the same time, the measuring signal amplified by the amplifier 20 is input to an analog/digital converter, ADC, input of the microcontroller of the wireless light sensor.

A change of the measuring signal, having a rate of change exceeding a threshold determined by the values of the second capacitor 36 and the third resistor 34, and bringing the microcontroller into an active mode, can be caused by the lamp(s) in the room (FIG. 1) being turned on, and thereby can serve as an indication of the lamp status (i.e. whether the lamp(s) has/have indeed been turned on to cause the rate of change of the measuring signal. The actual lamp status can be verified by the light sensor (being in the active mode) communicating with the controller of the lighting system by means of the light sensor's communication device. If the lamp(s) is/are confirmed to be active, e.g. activated (turned on) by a user or by a sensor, such as a room occupancy sensor, a light control by the controller 12 (FIG. 1) using data from the light sensor will be started.

To determine an initial light level measurement when the microcontroller is woken up from its sleeping mode, the microcontroller is configured as follows. When the (microcontroller of the) light sensor is in a sleeping mode, it is periodically (e.g. once every five minutes) brought in the active mode to measure the current light level and to send it to the controller 12 (FIG. 1) of the lighting system 10. This light level then can be used as an initial value by the controller 12 when the wake-up circuit triggers. Since the light sensor may be active very fast, a light control loop of the controller 12 can be very quickly adapted to minimize an initial effect. The power consumption of measuring and transmitting the current light level when the lamp(s) is/are turned off would cost very little power, e.g. 0.85 µA.

In accordance with the above, a wireless light sensor, being part of a lighting system, has a sensor element generating a light measuring signal, a microcontroller coupled to the sensor element, and a radio communication device coupled to the microcontroller. The microcontroller has an active mode and a sleeping mode. The light sensor further has a wake-up circuit that determines a rate of change of the light measuring signal, when the microcontroller is in the sleeping mode. The wake-up circuit brings the microcontroller from the sleeping mode into the active mode, when the rate of change of the light measuring signal exceeds a predetermined threshold. The lighting system has at least one light source, a controller for controlling the light source, and at least one light sensor. After the micro controller has been brought from the sleeping mode into the active mode, the light sensor is configured to communicate with the controller to verify the status of the light source to confirm the active mode of the light sensor.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily by wires, or mechanically.

A single processor or other unit may fulfill the functions of several items recited in the claims.

The invention claimed is:

1. A wireless light sensor comprising
a sensor element generating a light measuring signal;
a microcontroller coupled to the sensor element, the microcontroller having an active mode and a sleeping mode;
a radio communication device coupled to the microcontroller, and
a wake-up circuit comprising a comparator for comparing a momentary value of the light measuring signal with an average value of the light measuring signal and configured for
determining a rate of change of the light measuring signal, when the microcontroller is in the sleeping mode, and
bringing the microcontroller from the sleeping mode into the active mode, when the rate of change of the light measuring signal exceeds a predetermined threshold.

2. The light sensor of claim 1, wherein, when the microcontroller is in a sleeping mode, the light sensor is configured for periodically bringing the microcontroller in the active mode and transmitting data representative of the light measuring signal through the radio communication device, and bringing the microcontroller in the sleeping mode again.

3. The light sensor of claim 1, wherein a time period between subsequent active modes of the microcontroller is at least one minute, in particular at least five minutes.

4. A method of operating a wireless light sensor, the light sensor comprising
a sensor element generating a light measuring signal;
a microcontroller coupled to the sensor element, the microcontroller having an active mode and a sleeping mode, and
a radio communication device coupled to the microcontroller,
wherein the microcontroller has an active mode and a sleeping mode, and wherein the method comprises
determining a rate of change of the light measuring signal, when the microcontroller is in the sleeping mode, and
bringing the microcontroller from the sleeping mode into the active mode, if the rate of change of the light measuring signal, determined by comparing a momentary value of the light measuring signal with an average value of the light measuring signal, exceeds a predetermined threshold.

5. The method of claim 4, further comprising, when the microcontroller is in a sleeping mode, periodically bringing the microcontroller in the active mode and transmitting data representative of the light measuring signal, and bringing the microcontroller in the sleeping mode again.

6. A lighting system, comprising:
at least one light source;
a controller for controlling the light source; and
a wireless light sensor comprising
a sensor element generating a light measuring signal;
a microcontroller coupled to the sensor element, the microcontroller having an active mode and a sleeping mode;
a radio communication device coupled to the microcontroller, and
a wake-up circuit comprising a comparator for comparing a momentary value of the light measuring signal with an average value of the light measuring signal and configured for determining a rate of change of the light measuring signal, when the microcontroller is in the sleeping mode, and bringing the microcontroller from the sleeping mode into the active mode, when the rate of change of the light measuring signal exceeds a predetermined threshold.

7. The lighting system of claim 6, wherein, after the micro controller has been brought from the sleeping mode into the active mode, the light sensor is configured to communicate with the controller to verify the status of the light source to confirm the active mode of the light sensor.

* * * * *